(12) United States Patent
Gustof et al.

(10) Patent No.: US 12,020,555 B2
(45) Date of Patent: Jun. 25, 2024

(54) SYSTEM AND METHOD FOR DETECTING AND TRACKING A STATUS OF AN OBJECT RELEVANT TO AN INCIDENT

(71) Applicant: MOTOROLA SOLUTIONS, INC., Chicago, IL (US)

(72) Inventors: Grzegorz Gustof, Myslenice (PL); Lukasz Osuch, Pszczyna (PL); Joseph Namm, Plantation, FL (US); Pawel Wilkosz, Wisniowa (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/046,984

(22) Filed: Oct. 17, 2022

(65) Prior Publication Data
US 2024/0127688 A1 Apr. 18, 2024

(51) Int. Cl.
*G06F 15/173* (2006.01)
*G08B 25/01* (2006.01)
*H04W 4/029* (2018.01)

(52) U.S. Cl.
CPC .......... *G08B 25/016* (2013.01); *H04W 4/029* (2018.02)

(58) Field of Classification Search
CPC ............................ G08B 25/016; H04W 4/029
USPC ................................................. 709/223, 224
See application file for complete search history.

(56) References Cited

U.S. PATENT DOCUMENTS

| | | |
|---|---|---|
| 7,636,450 B1 | 12/2009 | Bourdev |
| 8,661,053 B2 | 2/2014 | Flynn et al. |
| 8,732,840 B2 | 5/2014 | Howes et al. |
| 8,976,184 B2 | 3/2015 | Sterchi et al. |
| 10,817,749 B2 | 10/2020 | Biswas et al. |
| 2009/0006937 A1 | 1/2009 | Knapp et al. |
| 2019/0197354 A1 | 6/2019 | Law et al. |
| 2019/0246477 A1* | 8/2019 | Sinitsyn ............... G08B 13/194 |
| 2019/0368758 A1* | 12/2019 | Aller ........................ F24F 11/56 |
| 2022/0399014 A1* | 12/2022 | Tan .......................... G10L 15/22 |

FOREIGN PATENT DOCUMENTS

| | | | |
|---|---|---|---|
| JP | 2006197226 A | * | 7/2006 |
| WO | 2013122809 A1 | | 8/2013 |

(Continued)

OTHER PUBLICATIONS

Budel, Richard et al.: "Improving Police "Body Cam" Programs with an End-to-End Solution", IBM Redpaper, In partnership with IBM Academy of Technology, URL: lhttp://www.redbooks.ibm.com/redpapers/pdfs/redp5276.pdf, 2016, all pages.

(Continued)

*Primary Examiner* — Liang Che A Wang

(57) ABSTRACT

Techniques for detecting and tracking a status of an object relevant to an incident are provided. A virtual partner associated with a first responder detects at least one object that is relevant to an incident to which the responder is responding. The virtual partner requests that a smart building controller track a status of the at least one object. It is determined that the at least one object is currently needed. An indication is received from the smart building controller when the at least one object is currently needed, indicating the status of the at least one object.

17 Claims, 6 Drawing Sheets

(56) References Cited

FOREIGN PATENT DOCUMENTS

| WO | 2019216779 A1 | 11/2019 | |
| WO | WO-2021162561 A1 * | 8/2021 | ............. G05B 15/02 |

OTHER PUBLICATIONS

Javier Coutor and Facundo Lezama: : "A Guide to Video Analytics: Applications and Opportunities", https://tryolabs.com/guides/video-analytics-guide, Monday, Aug. 29, 2022, all pages.
R. Muller, E. Rahm: "Rule-Based Dynamic Modification of Workflows in a Medical Domain", Institut fur Informatik, Universitat Leipzig, Augustusplatz, Oct. 2011, 04109 Leipzig, Buchmann, A.P. (ed.): Proceedings of BTW99, Freiburg im Breisgau, Mar. 1-3, 1999. Spinger, Berlin 1999: 429-448.
Ying Lu and Shunqi Sun: "Scenario-Based Allocation of Emergency Resources in Metro Emergencies: A Model Development and a Case Study of Nanjing Metro", MDPI, Accepted: Aug. 6, 2020; Published: Aug. 7, 2020 https://www.researchgate.net/publication/343559708_ScenarioBased_Allocation_of_Emergency_Resources_in_Metro_Emergencies_A_Model_Development_and_a_Case_Study_of_Nanjing_Metro/link/5f31f700a6fdcccc43bef39a/download, all pages.
Grandberg, Tobias Andersson, et al.: "Sensor Requirements for Logistics Analysis of Emergency Incident Sites", Sensor Requirements at Emergency Sites, WiP Paper—Technologies for First Responders Proceedings of the 17th ISCRAM Conference—Blacksburg, VA, USA May 2020.
The International Search Report and the Written Opinion, corresponding patent application No. PCT/US2023/034084, filed: Sep. 29, 2023, mailed Feb. 8, 2024, all pages.

* cited by examiner

SYSTEM AND METHOD FOR DETECTING AND TRACKING A STATUS OF AN OBJECT RELEVANT TO AN INCIDENT

BACKGROUND OF THE INVENTION

The availability of personal devices that record video is ever increasing. Most people generally carry a device, such as a smart phone, that includes the capability to record video. In the public safety/first responder community, the presence of body worn cameras (BWC) is becoming ubiquitous. The BWC may monitor a first responders environment. Use of BWC is not limited to first responders, as many other types of workers, especially those dealing with the public, may also be equipped with BWC.

Physical locations (e.g. buildings, etc.) may also be equipped with cameras (e.g. security cameras, etc.). In some cases those cameras may be integrated with a smart building controller to create a smart building. A smart building may monitor conditions within the building (e.g. fire, explosion, flooding, unauthorized entry, medical emergencies, etc.) and trigger appropriate alarms to public safety responders. A smart building controller may also simply cause the environment to be monitored (e.g. monitoring operations on a retail or factory floor, etc.).

The recording devices, such as BWCs, may further comprise, or provide access to, electronic digital assistants (sometimes referenced as "virtual partners" or "virtual assistants") that may provide the user thereof with valuable information in an automated (e.g., without further user input) or semi-automated (e.g., with some further user input) fashion. The virtual partners may use video analytics to monitor the environment recorded by the BWC to identify objects.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
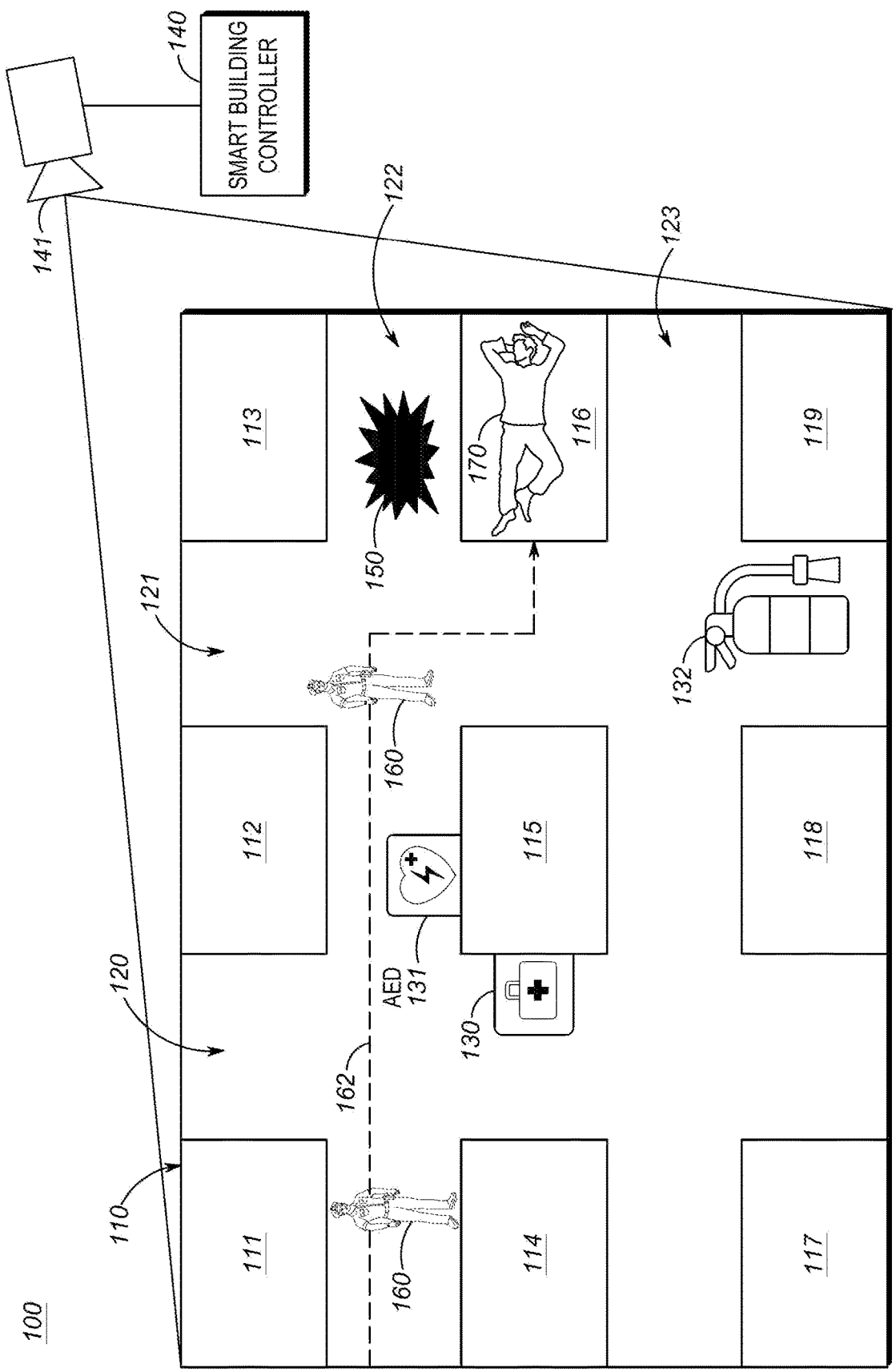
FIG. 1 is an example environment in which the techniques described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When an incident occurs, first responders generally bring with them all the equipment that would be expected to respond to the incident. For example, in the case where the incident is a person experiencing a medical emergency, such as a heart attack, emergency medical services (EMS) may bring equipment, such as an automated external defibrillator (AED), with them to aid in their response. First responders' procedures are generally well developed such that the exact equipment that would be needed to respond to an accurately identified incident is well defined.

However, a problem may arise when the incident is either not accurately identified, there is a change in the parameters of the incident, or the incident requires equipment that is not normally carried by the responding agency. For example, the incident may have been reported as a single person having a heart attack, so the responders may bring one AED. Upon arrival, it may be determined that there are actually two people having heart attacks, so two AEDs would be needed. As another example, a police officer may be dispatched to an incident involving an explosion. Upon arrival, the police officer may encounter an injured person requiring first aid. The police officer may not normally carry first aid equipment and as such would need to acquire a first aid kit.

The techniques described herein overcome this problem by determining the type of equipment, which can also be referred to as objects, that might be necessary when responding to an incident. In some cases this determination may be made by a smart building controller based on the incident type. In other cases, the determination may be made by a virtual partner associated with a person responding to the incident. Regardless of how the determination is made, the virtual partner is made aware of all types of objects that might be used when responding to the incident, regardless of if the object is a type that would normally be carried by the particular responder. For example, a police officer would not normally carry an AED, but such a device would be needed by EMS during a heart attack incident.

The responder's BWC may then be used to identify if any of the determined objects are available in the environment in which the incident is occurring. For example, many buildings are now equipped with AED devices in publically available areas, similar to how fire extinguishers are commonly available. As the first responder makes his way to the incident location (e.g. moves through a building), the BWC using video analytics, may identify if any of the determined objects have been detected.

Availability of the object may be dynamic. For example, the first responder may have passed an AED which was detected by the video analytics running on the BWC. However, at the time the object is needed, it may no longer be available. For example, between the detection of the object and the time it was determined the object was needed, someone else may have taken the object, thus making it no longer available. To overcome this problem, when an object that may be needed is detected, the virtual partner notifies a smart building controller associated with the incident location of the presence of the object. The smart building controller may then track the status of that object (e.g. has it been moved, is it no longer suitable for its intended purpose (e.g. fire extinguisher has now been emptied), etc.). What should be understood is that the smart building controller keeps track of if the object is currently available for use for its intended purpose.

At a later time, the responder may determine that the object that was detected (e.g. AED, etc.) is now needed and starts to go back to the location where the object was detected to retrieve the object. This determination may be made by the virtual partner by monitoring the context of the incident (e.g. a person having a heart attack has been identified, etc.) and monitoring the direction of motion of the first responder (e.g. responder has begun movement in a direction toward the object that could be used in the current incident). The virtual partner may then query the smart building controller, which has been tracking the status of the object, to determine if the object is still available and suitable for use. If not, the virtual partner may inform the responder that trying to retrieve the object is a waste of time and that alternative actions should be taken (e.g. perform CPR instead of using an AED, request additional equipment be brought to the incident scene, etc.).

A method is provided. The method includes detecting, by a virtual partner associated with a responder, at least one object that is relevant to an incident to which the responder is responding. The method also includes requesting, by the virtual partner, that a smart building controller track a status of the at least one object. The method also includes determining that the at least one object is currently needed. The method also includes receiving an indication, from the smart building controller, when the at least one object is currently needed, indicating the status of the at least one object.

In one aspect, the status of the at least one object includes a current location of the at least one object. In one aspect, the status of the at least one object includes if the at least one object is currently fit for purpose. In one aspect, the method further includes identifying a task assigned to the responder and detecting at least one object that is relevant to the task assigned to the responder. In one aspect, the method further includes identifying a task assigned to the responder and detecting at least one object that is not relevant to the task assigned to the responder. In one aspect, the method includes detecting the at least one object using a body worn camera associated with the responder, the body worn camera associated with the responder communicatively coupled to the virtual partner. In one aspect the smart building controller tracks the status of the at least one object using at least one video surveillance camera.

A system is provided. The system includes a processor and a memory coupled to the processor. The memory contains a set of instructions thereon that when executed by the processor causes the processor to detect, by a virtual partner associated with a responder, at least one object that is relevant to an incident to which the responder is responding. The instructions also cause the processor to request, by the virtual partner, that a smart building controller track a status of the at least one object. The instructions also cause the processor to determine that the at least one object is currently needed. The instructions also cause the processor to receive an indication, from the smart building controller, when the at least one object is currently needed, indicating the status of the at least one object.

In one aspect, the status of the at least one object includes a current location of the at least one object. In one aspect, the status of the at least one object includes if the at least one object is currently fit for purpose. In one aspect, the instructions to detect the at least one object that is relevant to an incident to which the responder is responding further comprises instructions to identify a task assigned to the responder and detect at least one object that is relevant to the task assigned to the responder. In one aspect, the instructions to detect the at least one object that is relevant to an incident to which the responder is responding further comprises instructions to identify a task assigned to the responder and detect at least one object that is not relevant to the task assigned to the responder. In one aspect, the memory further comprises instructions to detect the at least one object using a body worn camera associated with the responder, the body worn camera associated with the responder communicatively coupled to the virtual partner. In one aspect, the smart building controller tracks the status of the at least one object using at least one video surveillance camera.

A non-transitory processor readable medium containing a set of instructions thereon is provided. The instructions on the medium, when executed by a processor cause the processor to detect, by a virtual partner associated with a responder, at least one object that is relevant to an incident to which the responder is responding. The instructions on the medium further cause the processor to request, by the virtual partner, that a smart building controller track a status of the at least one object. The instructions on the medium further cause the processor to determine that the at least one object is currently needed. The instructions on the medium further casue the processor to receive an indication, from the smart building controller, when the at least one object is currently needed, indicating the status of the at least one object.

In one aspect, the status of the at least one object includes a current location of the at least one object. In one aspect, the status of the at least one object includes if the at least one object is currently fit for purpose. In one aspect, the instructions on the medium to detect the at least one object that is relevant to an incident to which the responder is responding further comprises instructions to identify a task assigned to the responder and detect at least one object that is relevant to the task assigned to the responder. In one aspect, the instructions on the medium to detect the at least one object that is relevant to an incident to which the responder is responding further comprises instructions to identify a task assigned to the responder and detect at least one object that is not relevant to the task assigned to the responder. In one aspect, the medium further comprises instructions to detect the at least one object using a body worn camera associated with the responder, the body worn camera associated with the responder communicatively coupled to the virtual partner.

Further advantages and features consistent with this disclosure will be set forth in the following detailed description, with reference to the figures.

FIG. 1 is an example environment 100 in which the techniques described herein may be implemented. FIG. 1 depicts a portion of a building 110 in which an incident may occur. The building may include a plurality of rooms 111-119. The building may also include multiple hallways 120-123. There may be items dispersed throughout the building 110 that may be useful in the case of a public safety incident (e.g. medical emergency, fire, etc.).

For example, a first aid kit 130 may be located in hallway 120. An AED 131 may be located in hallway 122. A fire extinguisher 132 may be located in hallway 121. Although three types of equipment (i.e. objects) are shown, it should be understood that this is simply for ease of description. There may be many other type of objects that could be utilized in the case of an incident response (e.g. fire axe, emergency food/water provisions, etc.).

Figure 6:
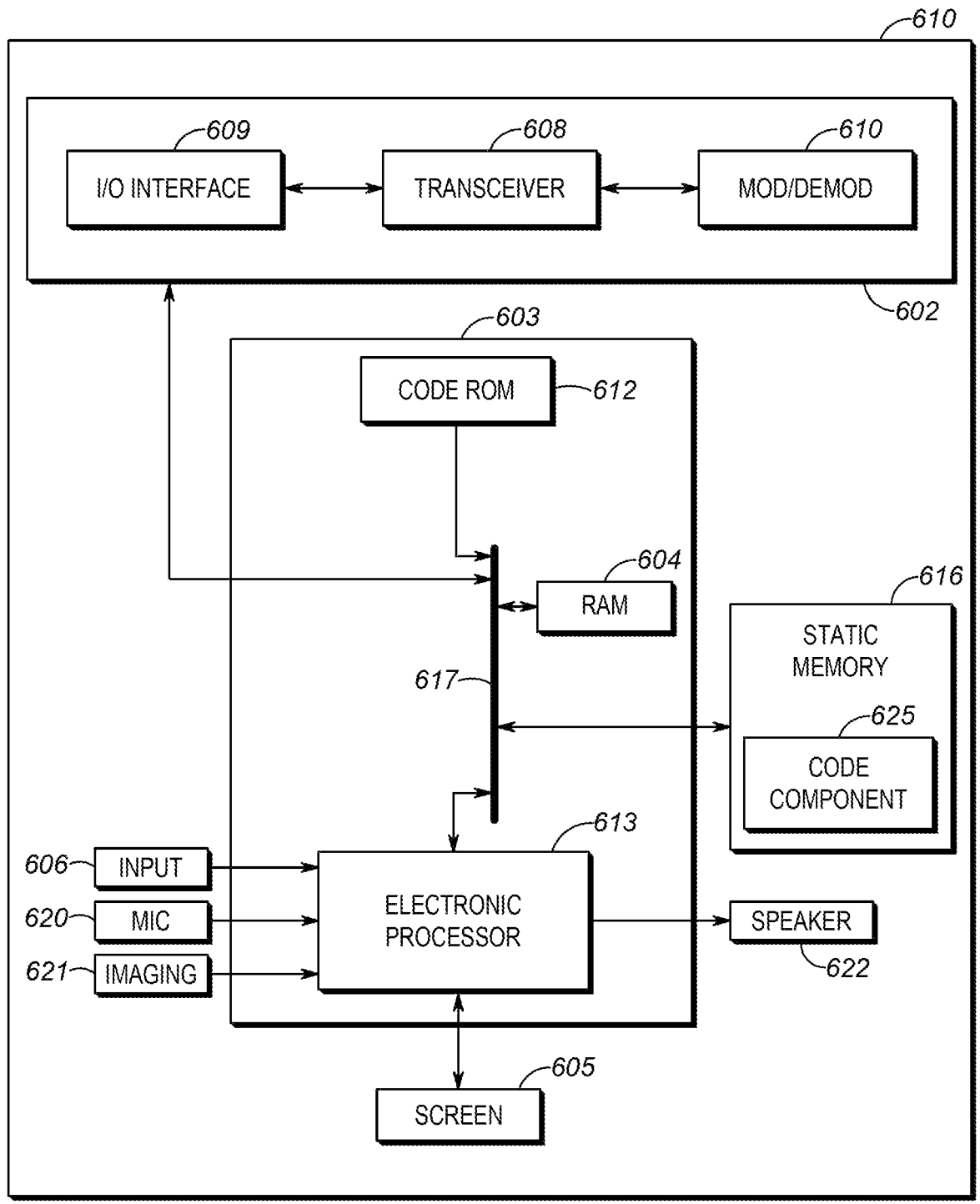
FIG. 6 is a device diagram showing a device structure of an electronic computing device for operating an electronic digital assistant, in accordance with some embodiments.

Building 110 may also include a smart building controller 140. An example, of a device that may implement a smart building controller is shown in FIG. 6. The smart building controller may be coupled to one or more cameras 141 that may be used to monitor the rooms 111-119 and hallways 120-123 of building 110. The smart building controller may also have the ability to track various objects within the building. The smart building controller may also be able to identify incidents (e.g. medical emergency, fire, explosion, etc.) that occur within the building. In some cases, the smart building controller may be able to report an incident to a public safety answering point (not shown) in order to request assistance from public safety first responders. In some implementations, the smart building controller may be able to determine the type of objects that might be needed to respond to an incident.

The smart building controller 140 may be coupled to many types of sensors within the building (not shown). For example, the smart building controller may be connected to smoke/fire detectors to detect fires/explosions, chemical detectors to detect chemical related incidents, access control systems to detect unauthorized access to the building, or any number of other systems.

In operation, an incident may occur in building 110. For purposes of this description, assume the incident is an explosion 150 that has occurred near room 116. The smart building controller 140 may detect the explosion and request assistance from public safety agencies. For example, the smart building controller may detect the explosion and prompt an alert that would cause building personnel to initiate a call to an emergency number (e.g. 911, etc.). In some cases, the smart building controller itself may directly contact the emergency response number in order to initiate a response by public safety officials.

In response to the request for assistance, a public safety dispatcher may dispatch resources (e.g. police, fire, EMS, etc.) to the building 110 to respond to the incident. In this example, assume that the first responder on scene is a police officer 160. Police officers generally do not carry firefighting or medical equipment while responding to incidents, so for purposes of this example, assume that the responding police officer is not equipped with firefighting or medical equipment.

The police officer 160 may be equipped with a BWC that is coupled to a virtual assistant (not shown). A more detailed description of the BWC and virtual assistant is described with respect to FIGS. 5 and 6. For purposes of this example, assume that the BWC is capable of detecting objects within the environment 100 that may be usable in responding to the incident. For example, based on the incident type, the types of objects that might be needed to respond may be determined.

In some implementations, the smart building controller 140, upon detecting the incident type, determines the equipment that may be used by responders with different roles. In some cases, this determination may be made based on historical data. For this example, in the case of an explosion, the historical data may indicate that police officers have used certain pieces of equipment (e.g. handcuffs, stun gun, etc.) when responding to explosions to apprehend suspects. The historical data may show that firefighters use different pieces of equipment (e.g. fire extinguishers, hoses, etc.) when responding to address the explosion. Likewise, EMS personnel may use yet other pieces of equipment (e.g. first aid kit, AED, etc.) when responding to treat injured people. It should be noted that historical information need not come from incidents at the building itself, but rather may be an aggregation of information gathered from all incidents of a given type, regardless of where they occurred. The type of equipment used to respond to an incident as determined by the smart building controller 140 may then be sent to the virtual partner of the responding officer 160.

In some implementations, the responding officer's 160 virtual partner is aware of the incident type that is being responded to and is also aware of the types of equipment that might be used by various agencies when responding to an incident of that type. What should be understood is that regardless of how determined, a list of equipment (i.e. objects) that might be used in responding to the incident is available to the virtual partner associated with the responding officer.

The responding officer 160 may make his way through the building to the incident location (e.g. explosion 150). In this example, the responding officer is following a path depicted by the dashed line 162. As the responding officer traverses path 162, his BWC may capture the environment as he moves through it. Analytics provided by the BWC/virtual partner may be performed on the environment to detect any objects that were identified on the list as possibly being usable to respond to the incident.

In the present example, the responder 160 may pass by the first aid kit 130 which was on the list of items that might be used by EMS personnel. The BWC/virtual partner may detect the first aid kit. Likewise, the first responder may pass by an AED 131 and a fire extinguisher 132, which are also objects on the list of objects that may be useful in responding to the incident.

Upon detection of each of these objects, the first responder's 160 virtual partner may send a message to the smart building controller 140 that the object was detected. The virtual partner may request that the smart building controller track the status of the object for potential later use. Tracking the status may include tracking the location of the object in case the object is moved by someone. Tracking the status can also include tracking if the object is currently suitable for its intended use (i.e. fit for purpose). For example, if an AED 131 is used by someone else, its battery may be discharged and can no longer be used. Likewise, if a fire extinguisher 132 has been used and is now empty, it is no longer suitable for additional use. It should be noted that an object could remain in its original position and still not be suitable for its intended use. For example, a first aid kit 130 including a tourniquet may have been detected, but between the time it was detected and the current time, someone may have removed the tourniquet (e.g. for use somewhere else, etc.). Although he first aid kit remains in the original position, the supplies contained within are no longer suitable for use in treating an injured person that requires a tourniquet.

The first responder 160 may arrive at the scene of the explosion 150 and notice an injured person 170 in room 116. The first responder may determine that the injured person is in need of immediate assistance and that a first aid kit 130 would be useful. The first responder may remember passing first aid kit 130 on his way to the incident scene and decide to return to that location in hallway 120 to retrieve the first aid kit. The first responder's virtual partner, using video analytics, may identify the injured person and also determine that a first aid kit is needed to provide aid. The virtual partner may monitor the first responders movements to predict that the first responder is moving toward the first aid kit previously detected.

The virtual partner may predict that the first responder 160 may need to retrieve the object based on other criteria as well. The current state of the responders equipment may be analyzed. For example, if the responder is using a fire extinguisher that is almost empty, it may be predicted that the responder will need another fire extinguisher. In addition, speech of the first responder may be monitored. For example, the first responder may be equipped with a radio and sends out a call for a piece of equipment. The responders speech could be analyzed to determine which piece of equipment is needed.

Once the virtual partner has determined that the first responder 160 is trying to retrieve the first aid kit 130 from hallway 120, the virtual partner may query the smart building controller 140 to retrieve the current state of the first aid kit. As described above, upon detection of the first aid kit, the virtual partner requested that the smart building controller keep track of the status of the object. If the object (e.g. the first aid kid 130) is still in the same location (e.g. hallway 120) and is still suitable for its intended use no further action is taken.

If the object is no longer in the original location it would be pointless for the first responder 160 to return to the location to retrieve the object. Likewise, if the object has been used to the extent that it is no longer suitable for use at the current time, it would also be pointless for the first responder to return to the location to retrieve the item. In the present example, assume that a tourniquet from the first aid kit is needed to respond to injured person 170 but the tourniquet has been removed from the first aid kit. The smart building controller 140 may then inform the virtual partner that the object (e.g. first aid kit) is not suitable for its intended use at the current time.

The virtual partner may then inform the first responder 160 that it does not make sense to return to the original location to retrieve the first aid kit. This would waste valuable time because it is already known that the object is not currently suitable for use. The first responder may use the time save to respond to the incident in an alternative fashion (e.g. use his belt as an improvised tourniquet, etc.). In some implementations, the virtual partner may provide alternative action recommendations. For example, the virtual partner may retrieve suggested alternative actions from a database and present options to the first responder.

Although FIG. 1 has been described in terms of a first responder responding to a building which includes a smart building controller, this was for ease of description only. Many cities are increasingly being equipped with "smart cities" features that include cameras monitoring a city. Smart city controllers may provide functionality similar to that provided with respect to smart building controllers. As such, the techniques described herein could be utilized with an incident response outdoors in a smart city. What should be understood is that objects that may be useful for responding to an incident are detected and tracked. Upon later determination that it is desired to use a detected object, the status of that object may be retrieved to determine if it is still suitable for use.

Figure 2:
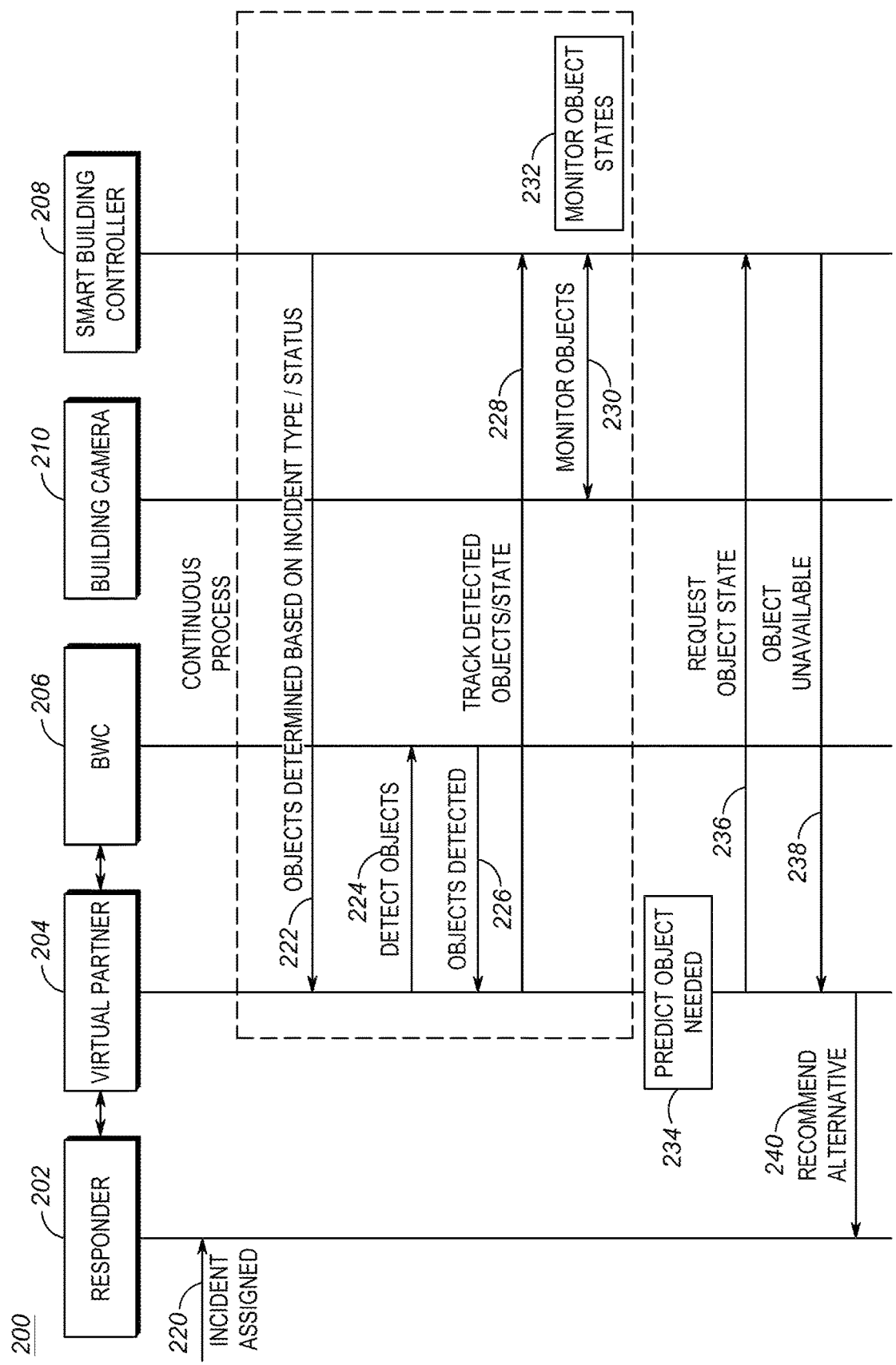
FIG. 2 is an example sequence diagram depicting interactions between entities according to the techniques described herein.

FIG. 2 is an example sequence diagram 200 depicting interactions between entities according to the techniques described herein. Responder 202 may be a public safety responder that is responding to an incident at a location, such as a building. The responder may be associated with a virtual partner 204 that may include capabilities to determine/receive a list of the type of objects that might be needed during an incident. The responder may also be associated with a BWC 206 that is capable of monitoring the responders environment. The incident location may be equipped with a smart building controller 208. The smart building controller may identify incidents and the types of objects needed to respond to those incidents. The smart building controller may be coupled to one or more building cameras 210 that are able to monitor the incident location (e.g. the building).

In operation an incident 220 may be assigned to the responder 202. For example, a public safety answering point (not shown) may receive a call at an emergency number (e.g. 911, etc.) reporting an incident at a location. As another example, the smart building controller 208 may detect an incident (e.g. fire, explosion, etc.) and report it to the public safety answering point. Regardless of how reported, a dispatcher may assign one or more responders to handle the incident. For ease of description, only a single responder is described, however it should be understood that the same techniques described are applicable regardless of the number and type of responders that are assigned to the incident.

Objects may be determined based on incident type/status 222. As explained above, for every incident type there may be certain objects (e.g. equipment) that are typically used when responding to that type of incident (e.g. heart attack typically requires and AED, etc.). Given the incident type, a list of such objects may be determined. It should further be understood that as the incident evolves, additional object types may be determined. For example, an initial incident type may be an explosion with no injuries, thus likely not requiring any medical type objects. However, the incident may later evolve to include physical injuries to people. Thus, as additional object types associated with the incident are determined, those object types may be added to the list.

As shown in FIG. 2, the smart building controller 208 determines the objects based on the incident type and passes the list of those objects to the virtual partner 204. It should be understood that this is simply one example implementation. In other implementations the virtual partner itself may determine the list of objects based on the incident type/status. In yet another example, both the smart building controller and the virtual partner may independently determine a list of objects that may be useful and the lists may be combined. Regardless of how determined, the list of objects is received by the virtual partner.

The virtual partner 204 may instruct the BWC 206 to detect the objects 224 identified in the list. The BWC may include video analytics that include object detection algorithms to detect objects in the list. There are many known object detection analytics and the techniques described herein are usable with any currently available or later developed analytics. In some embodiments, the BWC itself may not be equipped with video analytics, but instead may send video to the virtual partner which may then run video analytics on the video to detect objects. Regardless of where the analytics are performed, the objects detected 226 are known by the virtual partner.

The virtual partner may send a request to track detected objects' state 228 to the smart building controller 208. In turn the smart building controller may send an instruction to building camera 210 to monitor the state of the detected objects 230. Monitoring the state includes monitoring if the object has been moved, depleted, or altered in such a way that it is no longer suitable for its intended use (e.g. missing parts, etc.). The smart building controller may then monitor the object states 232.

The process described in steps 222-232, surrounded by the dashed box, is a continuous process. As the responder is responding to the incident the incident may be evolving. As such, the list of objects determined may be continuously evolving. Likewise, as the responder moves towards the incident location, his environment is continuously changing with the possibility that new objects in the environment are detected by the BWC 206.

A prediction that an object is needed 234 may be made. The prediction may be based on several factors that were described above. A simple example being that the virtual partner 204 determines that an object needed for the response is not currently possessed by the responder 204, the object has previously been detected, and the responder has begun moving in the direction where the object was first detected.

The virtual partner 204 may the request the object state 236 from the smart building controller 208. As described with respect to message 228, the virtual partner has previously requested that the smart building controller keep track of detected objects. If the object is still in the original location and suitable for use, the smart building controller may respond as such to the virtual partner (not shown). In such a case, the virtual partner need take no action as the responder is moving to retrieve an object that is still in the original location and is still suitable for use in responding to the incident.

However, in some cases, the object may no longer be in the same location or suitable for use. The object may have been moved to a different location, completely used up, or used to the extent that it is no longer useful for the responder's 202 needs. In such case, the smart building controller 208 may respond to the virtual partner 204 that the object is unavailable 238. In a simple implementation, the virtual partner may simply inform the responder that the object he is attempting to retrieve is no longer available and an alternate action should be performed. In a more complex implementation, the virtual partner may recommend an alternative course of action 240.

Figure 3:
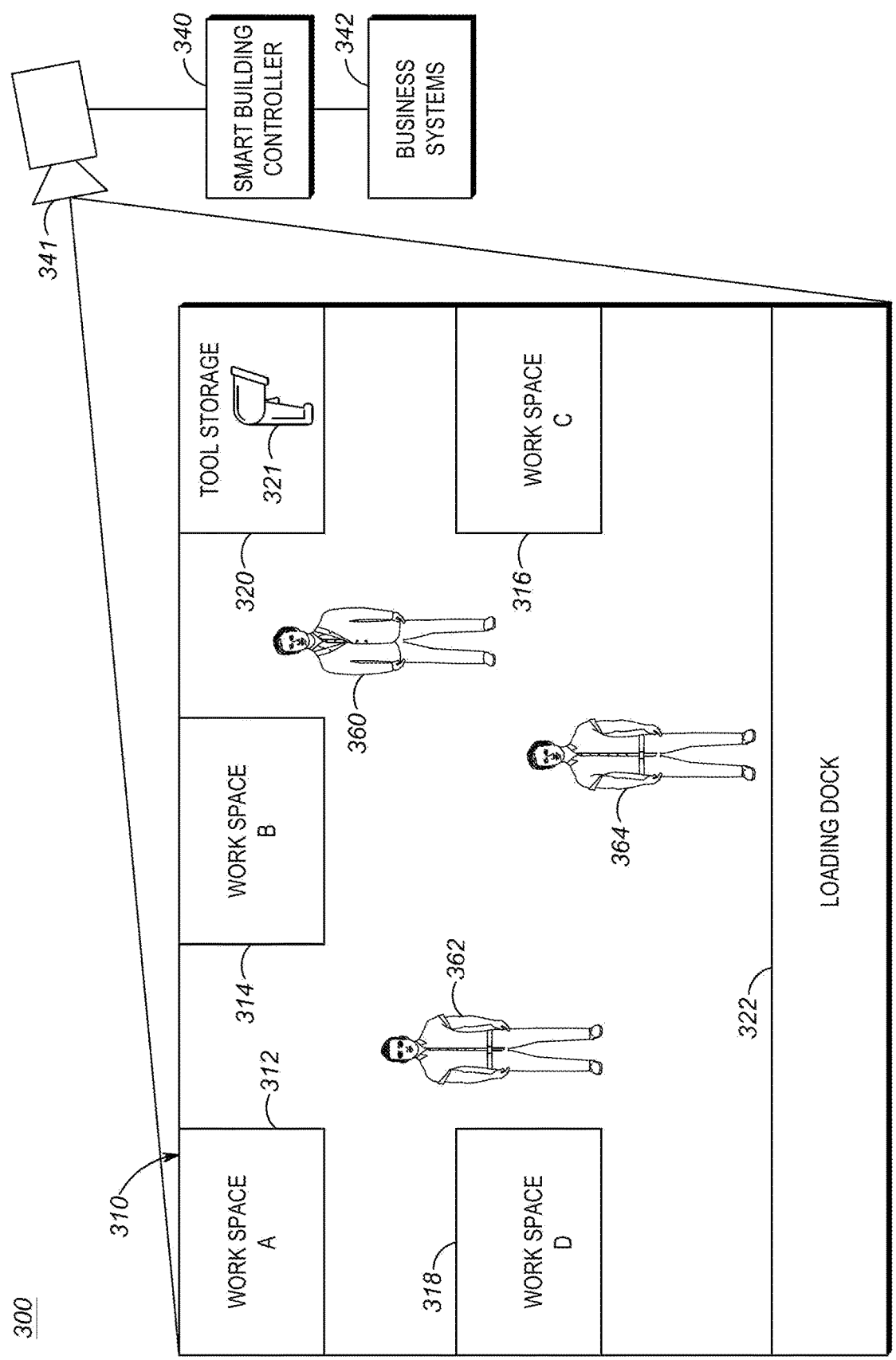
FIG. 3 is an example of a non-public safety environment in which the techniques described herein could be utilized.

FIG. 3 is an example of a non-public safety environment 300 in which the techniques described herein could be utilized. FIG. 3 describes an environment 300 that may be commercial in nature. For example, building 310 may be a warehouse floor. The warehouse floor may include workspace A 312, workspace B 314, workspace C 316, workspace D 318 which may be locations where various work activities take place (e.g. unpacking goods received, packing goods to be shipped, etc.). The warehouse may also include a tool storage area 320 where various tools that are used throughout the warehouse may be stored such that they can be retrieved by anyone from a known location. The warehouse may also include a loading dock 322 where goods can be sent and received via various forms of transportation.

The warehouse 310, just like the building 110, may be equipped with a smart building controller 340 coupled to one or more cameras 341 that are able to monitor the warehouse floor. The smart building controller may also be coupled to business systems 342 that may control aspects of the operations of the warehouse floor. In the example that will be described below, assume the business system 342 is utilized to keep track of shipments that are expected to be received.

In operation, the business system 342 may detect that there was a new delivery to the loading dock 322. Assume that in operation when a new delivery arrives a worker 360 would normally proceed to the tool storage area 320 to retrieve a tool to process the shipment. For example, a bar code scanner 321 may be used to scan incoming items such that the business system is made aware that an item has been received. In terms of the example presented with respect to FIG. 1, the incident may be that the shipment was received, and the type of equipment (e.g. object) needed for the incident is the bar code scanner, which is located in tool storage 320. As such, the business system may request that the smart building controller begin to track the bar code scanner (e.g. object).

The worker 360 may go to the tool storage area 320 and remove the bar code scanner to take with him to the loading dock 322. The worker may then scan some items from the loading dock in preparation for moving those items to a workspace, such as workspace B 314. The smart building controller would change the state of the bar codes scanner to being unavailable at the tool storage location because it was removed by worker 360. Assume that worker 360 accidently leaves the bar code scanner on the loading dock instead of returning it to the tool storage area.

A second worker 362 may be instructed by the business system 342 to retrieve additional items from the loading dock and bring them to a different workspace, such as workspace C 316. Per the assumed procedure, the first step is to acquire the bar code scanner 321 from the tool storage area. As the business system 342 has requested that the building controller 340 track the bar code scanner 321, the business system may first query the smart building controller to determine if the bar code scanner is still in the original location. In this particular example, it is not, as worker 360 has already removed the bar code scanner. As such, it would be a waste of time for worker 362 to go to the tool storage area 320.

The smart building controller 340 has tracked the bar code scanner 321 and is aware that it was left by worker 360 on the loading dock 322. The smart building controller may provide this information to the business system 342. The business system may then instruct the worker to proceed directly to loading dock to retrieve the bar code scanner.

In one implementation, the business system may determine which workers may need the bar code scanner 321 for the current shipment (e.g. incident) and where those workers will be coming from/going to. For example, assume worker 360 will be transporting items from the loading dock 322 to workspace B 314, worker 362 will be transporting items from the loading dock to workspace A 312, and worker 364 will be transporting items form the loading dock to workspace D 318. Each of these workers will require the bar code scanner, and based on the location of the tool storage area 320, it may not be efficient for each worker to obtain the bar code scanner, use it, and then return it to the tool storage area.

The business system 342 may determine that a better location for the bar code scanner 321 would be workspace C 316 as it would minimize the amount of travel each worker would need to do to retrieve the bar code scanner from the tool storage area 320. As such, the business system may instruct each user to return the bar code scanner to workspace C instead of the tool storage area.

Figure 4:
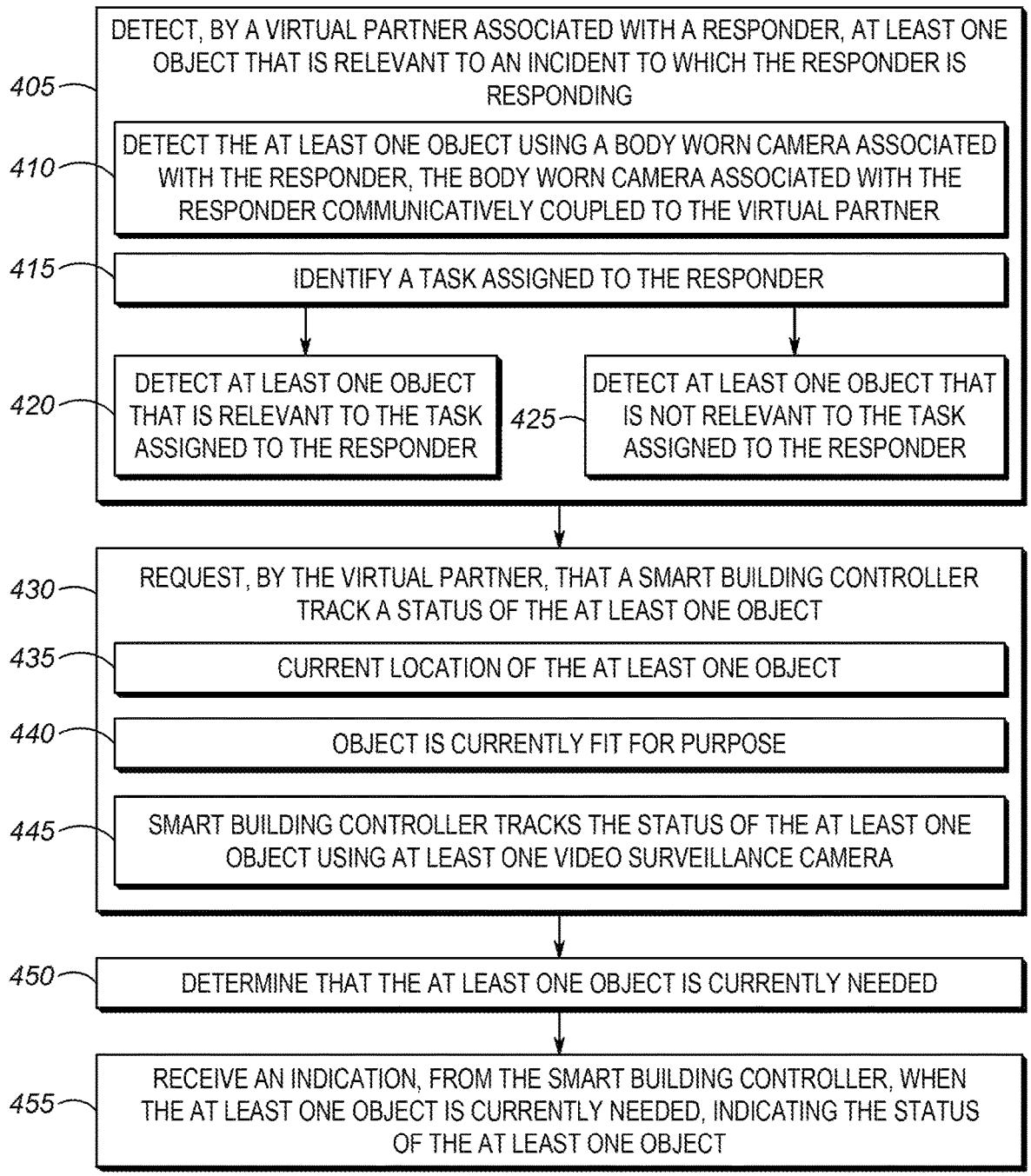
FIG. 4 is an example of a flow chart for implementing the detecting and tracking a status of an object relevant to an incident techniques described herein.

FIG. 4 is an example of a flow chart 400 for implementing the detecting and tracking a status of an object relevant to an incident techniques described herein. In block 405, a virtual partner associated with a responder may detect at least one object that is relevant to an incident to which the responder is responding. As explained above, for each type of incident there may be objects (e.g. pieces of equipment) that are determined to be relevant to responding to the incident. These objects may be determined based on historical responses to similar incidents. For example, if the incident that is being reported is a heart attack, historical incident responses may indicate that an AED is often used by EMS responders. Thus, an AED would be an object relevant to that particular type of incident.

In block 410, detecting the at least one object may be implemented by using a body worn camera associated with the responder. The body worn camera associated with the responder may be communicatively coupled to the virtual partner. In some implementations, the responder may wear/carry a body worn camera that is recording the environment of the responder. The body worn camera may itself be equipped with known video analytics to detect objects, such as the objects that might be relevant to responding to the incident. In other cases, the body worn camera may send the recorded video to the virtual partner to perform the analytics. Regardless of where the analytics are performed, a body worn camera may be used to initially capture the image of objects in the environment that might be relevant to responding to the incident.

In block 415, a task assigned to the responder may be identified. In many cases, and incident may require a response from multiple different agencies. For example, an incident, such as an explosion, may require a response from the fire department, to put out any fires, EMS to tend to any injuries, and law enforcement to investigate any potential crimes associated with the explosion. Each of these agencies is assigned to a specific task, which may also be referred to as a role. As should be clear, the tasks performed by responders from the different agencies may require different types of objects (e.g. equipment, etc.) in order to respond.

In block 420, at least one object that is relevant to the task assigned to the responder is detected. For example, when responding to an incident, a responder with a given roll may typically utilize certain equipment. For example, in the case of a heart attack incident, an EMS responder may typically use an AED. Thus, the AED is an object that is relevant to the EMS task. In block 425, at least one object that is not relevant to the task assigned to the responder is detected. Continuing with the example, although an AED may be relevant to the response of a EMS responder, it would not typically be used by a law enforcement responder. Thus, the AED would be an object that is not relevant to the task assigned to a law enforcement responder. The virtual partner is used to detect objects relevant to the incident, not just those that are relevant to a particular responder.

In block 430, the virtual partner may request that a smart building controller track a status of the at least one object. Once the object has been detected, it may be needed for use at a later time, in order to ensure that the object is still available at the later time its status may be tracked. In block 435, the status includes the current location of the at least one object. If an object is detected at a location, but is then later moved to a different location, returning to the original location to retrieve the object would be pointless as the object would no longer be there. By keeping track of the current location of the object, and if the object has been moved, this waste of time may be avoided.

In block 440, the status includes if the object is currently fit for purpose. Although an object may have remained at its original location, it may no longer be suitable for use by the responder in responding to the incident. For example, a fire extinguisher may have been used and returned to its original location in an empty state. Even though the fire extinguisher is still in the original location, it is no longer suitable for use in putting out fires. Likewise, a first aid kit may remain in its original location, but necessary supplies in the kit have been removed (e.g. all bandages have been used). The smart building controller may monitor if the object has been changed in such a way that it can no longer be considered usable by the responder.

In block 445, the smart building controller tracks the status of the at least one object using at least one video surveillance camera. The smart building controller may be integrated with the location of the incident. The incident location may be equipped with many different types of sensors, such as cameras. The cameras, may be used to track the detected objects to determine if the objects have moved using available motion tracking analytics. The cameras, or the smart building controller, may also be equipped with analytics to detect if the object has been altered in any way such that it is no longer suitable for use in the response.

In block 450, it may be determined that the at least one object is currently needed. As explained above, this may be due to the fact that the responder has encountered a situation that require objects that would not normally be relevant to the task assigned to the responder. For example, a law enforcement officer doing a criminal investigation of an explosion incident may come across a victim suffering a heart attack requiring use of an AED. Even though an AED is not typically a piece of equipment that is relevant to the law enforcement task, it is relevant to the incident. As such, the virtual partner still requested that the object is tracked.

In other cases, the object may be relevant to the task, but the responder requires additional resources. For example, an EMS responder may have brought a single AED to the incident scene expecting a single patient, but it is determined that there are actually two patients. As another example, a firefighter may have brought a fire extinguisher, but has emptied it and requires another one. Regardless of the reason why the object is needed, what should be understood is that at some point it may be determined that the object is currently needed.

In block 455, an indication may be received from the smart building controller when the at least one object is currently needed indicating the status of the at least one object. The status generally includes if the object is still at the original location and if it is currently fit for purpose. If the status indicates the object is no longer at the original location or is no longer fit for purpose, the responder may be given a notification that he should not return to the original location to retrieve the object, as doing so would be a waste of time. Instead, the responder may be given an alternate course of action (e.g. improvise other equipment, retrieve the object from its current tracked location, etc.).

1. Communication System and Device Structures a. Communication System Structure

Figure 5:
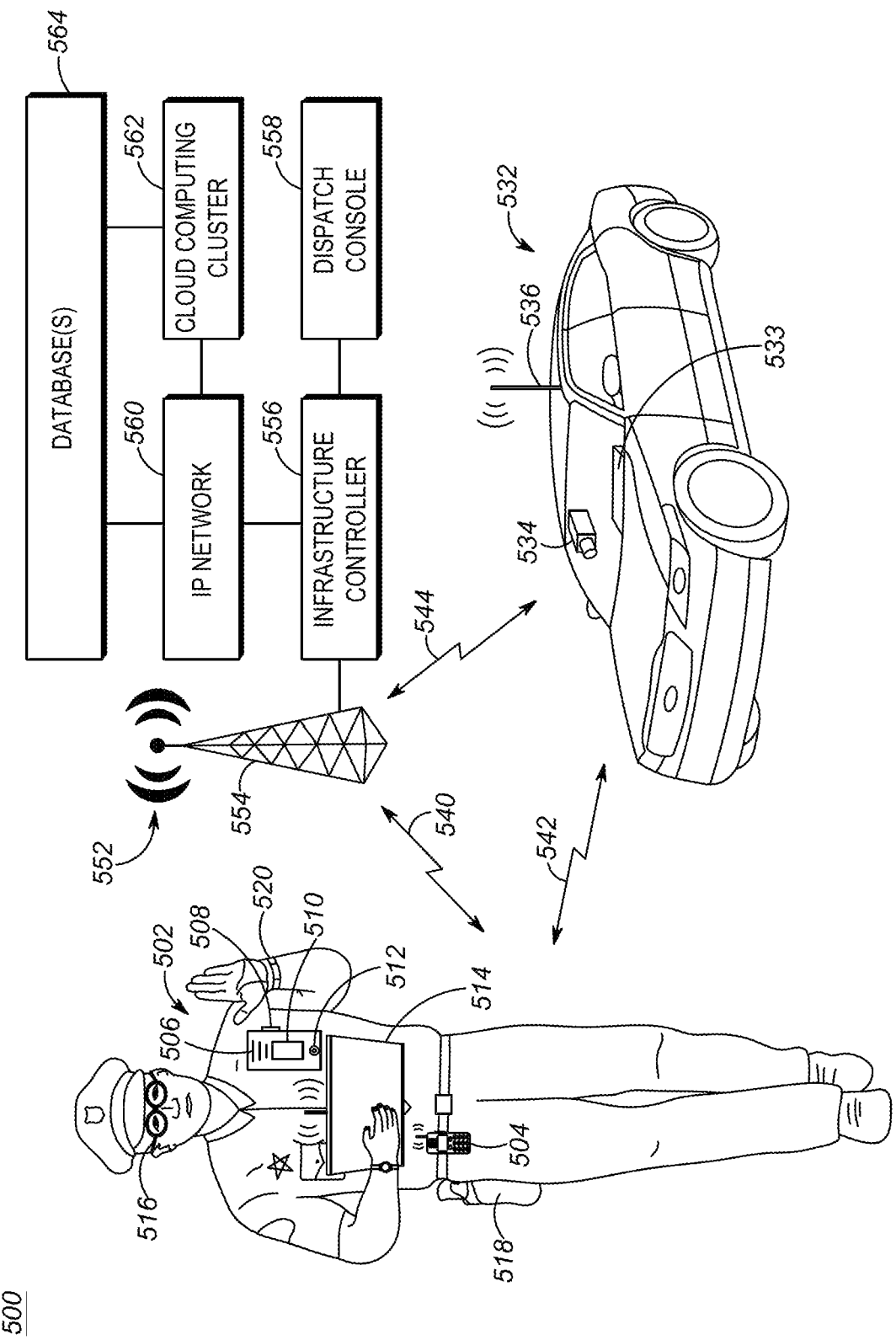
FIG. 5 is a system diagram illustrating a system for operating an electronic digital assistant, in accordance with some embodiments.

FIG. 5 is a system diagram illustrating a system for operating an electronic digital assistant, in accordance with some embodiments. In FIG. 5, a communication system diagram illustrates a system 500 of devices including a first set of devices that a user 502 (illustrated in FIG. 5 as a first responder police officer) may wear, such as a primary battery-powered portable radio 504 used for narrowband and/or broadband direct-mode or infrastructure communications, a battery-powered radio speaker microphone (RSM) video capture device 506, a laptop 514 having an integrated video camera and used for data applications such as incident support applications, smart glasses 516 (e.g., which may be virtual reality, augmented reality, or mixed reality glasses), sensor-enabled holster 518, and/or biometric sensor wristband 520. Although FIG. 5 illustrates only a single user 502 with a respective first set of devices, in other embodiments, the single user 502 may include additional sets of same or similar devices, and additional users may be present with respective additional sets of same or similar devices (wherein the single user 502 and the additional users may form a talkgroup of related users).

System 500 may also include a vehicle 532 associated with the user 502 having an integrated mobile communication device 533, an associated vehicular video camera 534, and a coupled vehicular transceiver 536. Although FIG. 5 illustrates only a single vehicle 532 with a single mobile communication device 533, respective single vehicular video camera 534 and/or microphone, single coupled vehicular transceiver 536, and single speaker, in other embodiments, the vehicle 532 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 504, RSM video capture device 506, laptop 514, and vehicular mobile communication device 533 may be capable of directly wirelessly communicating via direct-mode wireless link(s) 542, and/or may be capable of wirelessly communicating via a wireless infrastructure radio access network (RAN) 552 over respective wireless link(s) 540, 544 and via corresponding transceiver circuits. These devices may be referred to as communication devices and are configured to receive inputs associated with the user 502 and/or provide outputs to the user 502 in addition to communicating information to and from other communication devices and the infrastructure RAN 552.

The portable radio 504, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth, Zigbee, or NFC transmitter) with other communication devices and/or the infrastructure RAN 552. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 5, the portable radio 504 may form the hub of communication connectivity for the user 502, through which other accessory devices, such as a biometric sensor (for example, the biometric sensor wristband 520), an activity tracker, a weapon status sensor (for example, the sensor-enabled holster 518), a heads-up-display (for example, the smart glasses 516), the RSM video capture device 506, and/or the laptop 514 may communicatively couple.

In order to communicate with and exchange video, audio, and other media and communications with the RSM video capture device 506, laptop 514, and/or smart glasses 516, the portable radio 504 may contain one or more physical electronic ports (such as a USB port, an Ethernet port, an audio jack, etc.) for direct electronic coupling with the RSM video capture device 506, laptop 514, and/or smart glasses 516. In some embodiments, the portable radio 504 may contain a short-range transmitter (i.e., short-range in comparison to the long-range transmitter such as a LMR or broadband transmitter) and/or transceiver for wirelessly coupling with the RSM video capture device 506, laptop 514, and/or smart glasses 516. The short-range transmitter may be a Bluetooth, Zigbee, or NFC transmitter having a transmit range on the order of 0.01-100 meters, or 0.1-10 meters. In other embodiments, the RSM video capture device 506, the laptop 514, and/or the smart glasses 516 may contain their own long-range transceivers and may communicate with one another and/or with the infrastructure RAN 552 or vehicular transceiver 536 directly without passing through portable radio 504.

The RSM video capture device 506 provides voice functionality features similar to a traditional RSM, including one or more of acting as a remote microphone that is closer to the user's 502 mouth, providing a remote speaker allowing playback of audio closer to the user's 502 ear, and including a PTT switch or other type of PTT input. The voice and/or audio recorded at the remote microphone may be provided to the portable radio 504 for storage and/or analysis or for further transmission to other mobile communication devices or the infrastructure RAN 552, or may be directly transmitted by the RSM video capture device 506 to other communication devices or to the infrastructure RAN 552. The voice and/or audio played back at the remote speaker may be received from the portable radio 504 or received directly from one or more other communication devices or the infrastructure RAN 552. The RSM video capture device 506 may include a separate physical PTT switch 508 that functions, in cooperation with the portable radio 504 or on its own, to maintain the portable radio 504 and/or RSM video capture device 506 in a monitor only mode, and which switches the device(s) to a transmit-only mode (for half-duplex devices) or transmit and receive mode (for full-duplex devices) upon depression or activation of the PTT switch 508. The portable radio 504 and/or RSM video capture device 506 may form part of a group communications architecture that allows a single communication device to communicate with one or more group members (i.e., talkgroup members not shown in FIG. 5) associated with a particular group of devices at a same time.

Additional features may be provided at the RSM video capture device 506 as well. For example, a display screen 510 may be provided for displaying images, video, and/or text to the user 502 or to someone else. The display screen 510 may be, for example, a liquid crystal display (LCD) screen or an organic light emitting display (OLED) display screen. In some embodiments, a touch sensitive input interface may be incorporated into the display screen 510 as well, allowing the user 502 to interact with content provided on the display screen 510. A soft PTT input may also be provided, for example, via such a touch interface.

A video camera 512 may also be provided at the RSM video capture device 506, integrating an ability to capture images and/or video and store the captured image data (for further analysis) or transmit the captured image data as an image or video stream to the portable radio 504 and/or to other communication devices or to the infrastructure RAN 552 directly. The video camera 512 and RSM remote microphone may be used, for example, for capturing audio and/or video of a field-of-view associated with the user, perhaps including a suspect and the suspect's surroundings, storing the captured image and/or audio data for further analysis or transmitting the captured audio and/or video data as an audio and/or vide stream to the portable radio 504 and/or to other communication devices or to the infrastructure RAN 552 directly for further analysis. An RSM remote microphone of the RSM video capture device 506 may be an omni-directional or unidirectional microphone or array of omni-directional or unidirectional microphones that may be capable of identifying a direction from which a captured sound emanated.

In some embodiments, the RSM video capture device 506 may be replaced with a more limited body worn camera that may include the video camera 512 and/or microphone noted above for capturing audio and/or video, but may forego one or more of the features noted above that transform the body worn camera into a more full featured RSM, such as the separate physical PTT switch 508 and the display screen 510, remote microphone functionality for voice communications in cooperation with portable radio 504, and remote speaker.

The laptop 514, in particular, may be any wireless communication device used for infrastructure RAN or direct-mode media communication via a long-range or short-range wireless transmitter with other communication devices and/or the infrastructure RAN 552. The laptop 514 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 514 display screen may be, for example, an LCD screen or an OLED display screen. In some embodiments, a touch sensitive input interface may be incorporated into the display screen as well, allowing the user 502 to interact with content provided on the display screen. A soft PTT input may also be provided, for example, via such a touch interface.

Front and/or rear-facing video cameras may also be provided at the laptop 514, integrating an ability to capture video and/or audio of the user 502 and the user's 502 surroundings, perhaps including a field-of-view of the user 502 and/or a suspect (or potential suspect) and the suspect's surroundings, and store and/or otherwise process the captured video and/or audio for further analysis or transmit the captured video and/or audio as a video and/or audio stream to the portable radio 504, other communication devices, and/or the infrastructure RAN 552 for further analysis.

An in-ear or over-the ear earpiece or headphone (not shown) may be present for providing audio to the user in a private fashion that is not accessible to other users nearby the user 502. The earpiece or headphone may be wiredly or wirelessly communicatively coupled to one or both of the RSM 506 and the portable radio 504, which may be configured to provide audio received from the RAN 552 and/or from other users to the user 502 based on a manual configuration of the RSM 506 or the portable radio 504, or based on some automatic routing mechanism at the one of the RSM 506 and the portable radio 504 that may route all audio to the earpiece or headphone whenever it is detected as connected to the one of the RSM 506 and the portable radio 504, or may selectively route audio received at the one of the RSM 506 and the portable radio 504 to the earpiece or headphone based on various contextual parameters, such as a content of the received audio, an identity of who sent the received audio, a covert status of the user 502, an incident status of the user 502, a determination of nearby users associated with the user 502, or some other contextual parameter.

The smart glasses 516 may include a digital imaging device, an electronic processor, a short-range and/or long-range transceiver device, and/or a projecting device. The smart glasses 516 may maintain a bi-directional connection with the portable radio 504 and provide an always-on or on-demand video feed pointed in a direction of the user's 502 gaze via the digital imaging device, and/or may provide a personal display via the projection device integrated into the smart glasses 516 for displaying information such as text, images, or video received from the portable radio 504 or directly from the infrastructure RAN 552. In some embodiments, the smart glasses 516 may include its own long-range transceiver and may communicate with other communication devices and/or with the infrastructure RAN 552 or vehicular transceiver 536 directly without passing through portable radio 504. In other embodiments, an additional user interface mechanism such as a touch interface or gesture detection mechanism may be provided at the smart glasses 516 that allows the user 502 to interact with the display elements displayed on the smart glasses 516 or projected into the user's 502 eyes, or to modify operation of the digital imaging device. In still other embodiments, a display and input interface at the portable radio 504 may be provided for interacting with smart glasses 516 content and modifying operation of the digital imaging device, among other possibilities.

The smart glasses 516 may provide a virtual reality interface in which a computer-simulated reality electronically replicates an environment with which the user 502 may interact. In some embodiments, the smart glasses 516 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 516 may provide a mixed reality interface in which electronically generated objects are inserted in a direct or indirect view of real-world environments in a manner such that they may co-exist and interact in real time with the real-world environment and real world objects.

The sensor-enabled holster 518 may be an active (powered) or passive (non-powered) sensor that maintains and/or provides state information regarding a weapon or other item normally disposed within the user's 502 sensor-enabled holster 518. The sensor-enabled holster 518 may detect a change in state (presence to absence) and/or an action (removal) relative to the weapon normally disposed within the sensor-enabled holster 518. The detected change in state and/or action may be reported to the portable radio 504 via its short-range transceiver. In some embodiments, the sensor-enabled holster 518 may also detect whether the first responder's hand is resting on the weapon even if it has not yet been removed from the holster and provide such information to portable radio 504. Other possibilities exist as well.

The biometric sensor wristband 520 may be an electronic device for tracking an activity of the user 502 or a health status of the user 502, and may include one or more movement sensors (such as an accelerometer, magnetometer, and/or gyroscope) that may periodically or intermittently provide to the portable radio 504 indications of orientation, direction, steps, acceleration, and/or speed, and indications of health such as one or more of a captured heart rate, a captured breathing rate, and a captured body temperature of the user 502, perhaps accompanying other information. In some embodiments, the biometric sensor wristband 520 may include its own long-range transceiver and may communicate with other communication devices and/or with the infrastructure RAN 552 or vehicular transceiver 536 directly without passing through portable radio 504.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 520 itself, or disposed separately and communicate with the sensor wristband 520 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 520 is shown in FIG. 5 as a bracelet worn around the wrist, in other examples, the biometric sensor wristband 520 may additionally and/or alternatively be worn around another part of the body, or may take a different physical form including an earring, a finger ring, a necklace, a glove, a belt, or some other type of wearable, ingestible, or insertable form factor.

The portable radio 504, RSM video capture device 506, laptop 514, smart glasses 516, sensor-enabled holster 518, and/or biometric sensor wristband 520 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 504 and/or RSM video capture device 506 (or any other electronic device in FIG. 5, for that matter) may each include a location determination device integrated with or separately disposed in the portable radio 504 and/or RSM 506 and/or in respective receivers, transmitters, or transceivers of the portable radio 504 and RSM 506 for determining a location of the portable radio 504 and RSM 506. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 552.

The vehicle 532 associated with the user 502 may include the mobile communication device 533, the vehicular video camera 534 and/or microphone, and the vehicular transceiver 536, all of which may be coupled to one another via a wired and/or wireless vehicle area network (VAN), perhaps along with other sensors physically or communicatively coupled to the vehicle 532. The vehicular transceiver 536 may include a long-range transceiver for directly wirelessly communicating with communication devices such as the portable radio 504, the RSM 506, and the laptop 514 via wireless link(s) 542 and/or for wirelessly communicating with the RAN 552 via wireless link(s) 544. The vehicular transceiver 536 may further include a short-range wireless transceiver or wired transceiver for communicatively coupling between the mobile communication device 533 and/or the vehicular video camera 534 in the VAN. The mobile communication device 533 may, in some embodiments, include the vehicular transceiver 536 and/or the vehicular video camera 534 integrated therewith, and may operate to store and/or process video and/or audio produced by the video camera 534 and/or transmit the captured video and/or audio as a video and/or audio stream to the portable radio 504, other communication devices, and/or the infrastructure RAN 552 for further analysis. The omni-directional or unidirectional microphone, or an array thereof, may be integrated in the video camera 534 and/or at the vehicular computing device 533 (or additionally or alternatively made available at a separate location of the vehicle 532) and communicably coupled to the vehicular computing device 533 and/or vehicular transceiver 536 for capturing audio and storing, processing, and/or transmitting the audio in a same or similar manner as set forth above with respect to the RSM 506.

Although FIG. 5 illustrates the vehicular video camera 534 and microphone as being placed inside the vehicle 532, in other embodiments, one or both of the vehicular video camera 534 and microphone may be placed at visible or hidden locations outside of the vehicle 532, such as within a vehicular grill portion or bumper portion, or on a roof portion, of the vehicle 532. Further, the single speaker (not shown) may be inside of the vehicle 532 and coupled to the vehicular computing device 533, in other embodiments, multiple speakers may be provided inside and/or outside of the vehicle 532 (all addressed simultaneously or individually addressable for outputting separate audio streams), or the single speaker may be placed outside of the vehicle and function as a PA speaker, among other possibilities.

The vehicle 532 may be a human-operable vehicle, or may be a self-driving vehicle operable under control of mobile communication device 533 perhaps in cooperation with video camera 534 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 532 and/or transceiver 536, similar to the portable radio 504 and/or respective receivers, transmitters, or transceivers thereof, may include a location (and/or orientation) determination device integrated with or separately disposed in the mobile communication device 533 and/or transceiver 536 for determining (and storing and/or transmitting) a location (and/or orientation) of the vehicle 532.

In some embodiments, instead of a vehicle 532, a land, air, or water-based drone with the same or similar audio and/or video and communications capabilities and the same or similar self-navigating capabilities as set forth above may be disposed, and may similarly communicate with the user's 502 PAN and/or with the infrastructure RAN 552 to support the user 502 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras and sensors) within the VAN and PAN.

Although the RSM 506, the laptop 514, and the vehicle 532 are illustrated in FIG. 5 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 552 is a radio access network that provides for radio communication links to be arranged within the network between a plurality of user terminals. Such user terminals may be portable, mobile, or stationary and may include any one or more of the communication devices illustrated in FIG. 5, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 552 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 552 are made via respective serving fixed terminals. Sites of neighboring fixed terminals may be offset from one another and may provide corresponding non-overlapping or partially or fully overlapping RF coverage areas.

Infrastructure RAN 552 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 552 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 552 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 5, such a middleware server may be disposed in infrastructure RAN 552 at infrastructure controller 556 or at a separate cloud computing cluster such as cloud compute cluster 562 communicably coupled to controller 556 via internet protocol (IP) network 560, among other possibilities.

The infrastructure RAN 552 is illustrated in FIG. 5 as providing coverage for the portable radio 504, RSM video capture device 506, laptop 514, smart glasses 516, and/or vehicle transceiver 536 via a single fixed terminal 554 coupled to a single infrastructure controller 556 (e.g., a radio controller, call controller, PTT server, zone controller, MME, BSC, MSC, site controller, Push-to-Talk controller, or other network device) and including a dispatch console 558 operated by a dispatcher. In other embodiments, additional fixed terminals and additional controllers may be disposed to support a larger geographic footprint and/or a larger number of mobile devices.

The infrastructure controller 556 illustrated in FIG. 5, or some other back-end infrastructure device or combination of back-end infrastructure devices existing on-premises or in the remote cloud compute cluster 562 accessible via the IP network 560 (such as the Internet), may additionally or alternatively operate as a back-end electronic digital assistant, a back-end audio and/or video processing device, and/or a remote cloud-based storage device consistent with the remainder of this disclosure.

The IP network 560 may comprise one or more routers, switches, LANs, WLANs, WANs, access points, or other network infrastructure, including but not limited to, the public Internet. The cloud compute cluster 562 may be comprised of a plurality of computing devices, such as the one set forth in FIGS. 6, one or more of which may be executing none, all, or a portion of an electronic digital assistant service, sequentially or in parallel, across the one or more computing devices. The one or more computing devices comprising the cloud compute cluster 562 may be geographically co-located or may be separated by inches, meters, or miles, and inter-connected via electronic and/or optical interconnects. Although not shown in FIG. 5, one or more proxy servers or load balancing servers may control which one or more computing devices perform any part or all of the electronic digital assistant service.

Database(s) 564 may be accessible via IP network 560 and/or cloud compute cluster 562, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 564 may further include all or a portion of the databases described herein as being provided at infrastructure controller 556. In some embodiments, the databases 564 may be maintained by third parties (for example, the National Weather Service or a Department of Transportation, respectively). As shown in FIG. 5, the databases 564 are communicatively coupled with the infrastructure RAN 552 to allow the communication devices (for example, the portable radio 504, the RSM video capture device 506, the laptop 514, and the mobile communication device 533) to communicate with and retrieve data from the databases 564 via infrastructure controller 556 and IP network 560. In some embodiments, the databases 564 are commercial cloud-based storage devices. In some embodiments, the databases 564 are housed on suitable on-premises database servers. The databases 564 of FIG. 5 are merely examples. In some embodiments, the system 500 additionally or alternatively includes other databases that store different information. In some embodiments, the databases 564 disclosed herein and/or additional or other databases are integrated with, or internal to, the infrastructure controller 556.

Finally, although FIG. 5 describes a communication system 500 generally as a public safety communication system that includes a user 502 generally described as a police officer and a vehicle 532 generally described as a police car or cruiser, in other embodiments, the communication system 500 may additionally or alternatively be a retail communication system including a user 502 that may be an employee of a retailer and a vehicle 532 that may be a vehicle for use by the user 502 in furtherance of the employee's retail duties (e.g., a shuttle or self-balancing scooter). In other embodiments, the communication system 500 may additionally or alternatively be a warehouse communication system including a user 502 that may be an employee of a warehouse and a vehicle 532 that may be a vehicle for use by the user 502 in furtherance of the employee's retail duties (e.g., a forklift). In still further embodiments, the communication system 500 may additionally or alternatively be a private security communication system including a user 502 that may be an employee of a private security company and a vehicle 532 that may be a vehicle for use by the user 502 in furtherance of the private security employee's duties (e.g., a private security vehicle or motorcycle). In even further embodiments, the communication system 500 may additionally or alternatively be a medical communication system including a user 502 that may be a doctor or nurse of a hospital and a vehicle 532 that may be a vehicle for use by the user 502 in furtherance of the doctor or nurse's duties (e.g., a medical gurney or ambulance). In still another example embodiment, the communication system 500 may additionally or alternatively be a heavy machinery communication system including a user 502 that may be a miner, driller, or extractor at a mine, oil field, or precious metal or gem field and a vehicle 532 that may be a vehicle for use by the user 502 in furtherance of the miner, driller, or extractor's duties (e.g., an excavator, bulldozer, crane, front loader). As one other example, the communication system 500 may additionally or alternatively be a transportation logistics communication system including a user 502 that may be a bus driver or semi-truck driver at a school or transportation company and a vehicle 532 that may be a vehicle for use by the user 502 in furtherance of the driver's duties. In the examples of a user 502 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

b. Device Structure

FIG. 6 is a device diagram showing a device structure of an electronic computing device for operating an electronic digital assistant, in accordance with some embodiments. FIG. 6 sets forth a schematic diagram that illustrates a communication device 600 according to some embodiments of the present disclosure. The communication device 600 may be, for example, embodied in the portable radio 504, the RSM video capture device 506, the laptop 514, the mobile communication device 533, the infrastructure controller 556, the dispatch console 558, one or more computing devices in the cloud compute cluster 562, the smart building controller 140, 340, or some other communication device not illustrated in FIG. 5, and/or may be a distributed communication device across two or more of the foregoing (or multiple of a same type of one of the foregoing) and linked via a wired and/or wireless communication link(s). In some embodiments, the communication device 600 (for example, the portable radio 504) may be communicatively coupled to other devices such as the sensor-enabled holster 518 as described above. In such embodiments, the combination of the portable radio 504 and the sensor-enabled holster 518 may be considered a single communication device 600.

While FIG. 6 represents the communication devices described above with respect to FIG. 5, depending on the type of the communication device, the communication device 600 may include fewer or additional components in configurations different from that illustrated in FIG. 6. For example, in some embodiments, communication device 600 acting as the infrastructure controller 556 may not include one or more of the screen 605, input device 606, microphone 620, imaging device 621, and speaker 622. As another example, in some embodiments, the communication device 600 acting as the portable radio 504 or the RSM video capture device 506 may further include a location determination device (for example, a global positioning system (GPS) receiver) as explained above. Other combinations are possible as well.

As shown in FIG. 6, communication device 600 includes a communications unit 602 coupled to a common data and address bus 617 of a processing unit 603. The communication device 600 may also include one or more input devices (e.g., keypad, pointing device, touch-sensitive surface, etc.) 606 and an electronic display screen 605 (which, in some embodiments, may be a touch screen and thus also act as an input device 606), each coupled to be in communication with the processing unit 603.

The microphone 620 may be present for capturing audio from a user and/or other environmental or background audio that is further processed by processing unit 603 in accordance with the remainder of this disclosure and/or is transmitted as voice or audio stream data, or as acoustical environment indications, by communications unit 602 to other portable radios and/or other communication devices. The imaging device 621 may provide video (still or moving images) of an area in a field of view of the communication device 600 for further processing by the processing unit 603 and/or for further transmission by the communications unit 602. A speaker 622 may be present for reproducing audio that is decoded from voice or audio streams of calls received via the communications unit 602 from other portable radios, from digital audio stored at the communication device 600, from other ad-hoc or direct mode devices, and/or from an infrastructure RAN device, or may playback alert tones or other types of pre-recorded audio.

The processing unit 603 may include a code Read Only Memory (ROM) 612 coupled to the common data and address bus 617 for storing data for initializing system components. The processing unit 603 may further include an electronic processor 613 (for example, a microprocessor or another electronic device) coupled, by the common data and address bus 617, to a Random Access Memory (RAM) 604 and a static memory 616.

The communications unit 602 may include one or more wired and/or wireless input/output (I/O) interfaces 609 that are configurable to communicate with other communication devices, such as the portable radio 504, the laptop 514, the wireless RAN 152, and/or the mobile communication device 533.

For example, the communications unit 602 may include one or more wireless transceivers 608, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 602 may additionally or alternatively include one or more wireline transceivers 608, such as an Ethernet transceiver, a USB transceiver, or similar transceiver configurable to communicate via a twisted pair wire, a coaxial cable, a fiber-optic link, or a similar physical connection to a wireline network. The transceiver 608 is also coupled to a combined modulator/demodulator 610.

The electronic processor 613 has ports for coupling to the display screen 605, the input device 606, the microphone 620, the imaging device 621, and/or the speaker 622. Static memory 616 may store operating code 625 for the electronic processor 613 that, when executed, performs one or more of the steps set forth in FIG. 4 and accompanying text.

The static memory 616 may comprise, for example, a hard-disk drive (HDD), an optical disk drive such as a compact disk (CD) drive or digital versatile disk (DVD) drive, a solid state drive (SSD), a flash memory drive, or a tape drive, and the like.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   detecting, by a virtual partner associated with a responder, at least one object that is relevant to an incident to which the responder is responding;
   requesting, by the virtual partner, that a smart building controller track a status of the at least one object, wherein the status of the at least one object includes if the at least one object is currently fit for purpose, wherein the at least one object is fit for purpose when being suitable for an intended use;
   determining that the at least one object is currently needed;
   determining the responder is moving in the direction of the at least one object to retrieve the at least one object; and
   receiving an indication, from the smart building controller, when the at least one object is currently needed and is not currently fit for purpose, the indication informing the responder that it does not make sense to continue moving in the direction of the at least one object to retrieve the at least one object because the at least one object is no longer fit for purpose to satisfy the current need.

2. The method of claim 1 wherein the status of the at least one object includes a current location of the at least one object.

3. The method of claim 1 wherein detecting the at least one object that is relevant to an incident to which the responder is responding further comprises:
   identifying a task assigned to the responder; and
   detecting at least one object that is relevant to the task assigned to the responder.

4. The method of claim 1 wherein detecting the at least one object that is relevant to an incident to which the responder is responding further comprises:
   identifying a task assigned to the responder; and
   detecting at least one object that is not relevant to the task assigned to the responder.

5. The method of claim 1 further comprising:
   detecting the at least one object using a body worn camera associated with the responder, the body worn camera associated with the responder communicatively coupled to the virtual partner.

6. The method of claim 1 wherein the smart building controller tracks the status of the at least one object using at least one video surveillance camera.

7. A system comprising:
   a processor; and
   a memory coupled to the processor, the memory containing a set of instructions thereon that when executed by the processor cause the processor to:
   detect, by a virtual partner associated with a responder, at least one object that is relevant to an incident to which the responder is responding;
   request, by the virtual partner, that a smart building controller track a status of the at least one object, wherein the status of the at least one object includes if the at least one object is currently fit for purpose, wherein the at least one object is fit for purpose when being suitable for an intended use;
   determine that the at least one object is currently needed;
   determine the responder is moving in the direction of the at least one object to retrieve the at least one object; and
   receive an indication, from the smart building controller, when the at least one object is currently needed and is not currently fit for purpose, the indication informing the responder that it does not make sense to continue moving in the direction of the at least one object to retrieve the at least one object because the at least one object is no longer fit for purpose to satisfy the current need.

8. The system of claim 7 wherein the status of the at least one object includes a current location of the at least one object.

9. The system of claim 7 wherein the instructions to detect the at least one object that is relevant to an incident to which the responder is responding further comprises instructions to:
   identify a task assigned to the responder; and
   detect at least one object that is relevant to the task assigned to the responder.

10. The system of claim 7 wherein the instructions to detect the at least one object that is relevant to an incident to which the responder is responding further comprises instructions to:
    identify a task assigned to the responder; and
    detect at least one object that is not relevant to the task assigned to the responder.

11. The system of claim 7 further comprising instructions to:
    detect the at least one object using a body worn camera associated with the responder, the body worn camera associated with the responder communicatively coupled to the virtual partner.

12. The system of claim 7 wherein the smart building controller tracks the status of the at least one object using at least one video surveillance camera.

13. A non-transitory processor readable medium containing a set of instructions thereon that when executed by a processor cause the processor to:
    detect, by a virtual partner associated with a responder, at least one object that is relevant to an incident to which the responder is responding;
    request, by the virtual partner, that a smart building controller track a status of the at least one object, wherein the status of the at least one object includes if the at least one object is currently fit for purpose, wherein the at least one object is fit for purpose when being suitable for an intended use;
    determine that the at least one object is currently needed;
    determine the responder is moving in the direction of the at least one object to retrieve the at least one object; and
    receive an indication, from the smart building controller, when the at least one object is currently needed and is not currently fit for purpose, the indication informing the responder that it does not make sense to continue moving in the direction of the at least one object to retrieve the at least one object because the at least one object is no longer fit for purpose to satisfy the current need.

14. The medium of claim 13 wherein the status of the at least one object includes a current location of the at least one object.

15. The medium of claim 13 wherein the instructions to detect the at least one object that is relevant to an incident to which the responder is responding further comprises instructions to:
    identify a task assigned to the responder; and
    detect at least one object that is relevant to the task assigned to the responder.

16. The medium of claim 13 wherein the instructions to detect the at least one object that is relevant to an incident to which the responder is responding further comprises instructions to:
- identify a task assigned to the responder; and
- detect at least one object that is not relevant to the task assigned to the responder.

17. The medium of claim 13 further comprising instructions to:
- detect the at least one object using a body worn camera associated with the responder, the body worn camera associated with the responder communicatively coupled to the virtual partner.

* * * * *